Nov. 29, 1966     W. V. SLOMINSKI     3,288,503
SPRING CLIP
Filed May 4, 1964     2 Sheets-Sheet 1

INVENTOR.
WALTER V. SLOMINSKI
BY
Olsen and Stephenson
ATTORNEYS

Nov. 29, 1966  W. V. SLOMINSKI  3,288,503
SPRING CLIP

Filed May 4, 1964  2 Sheets-Sheet 2

INVENTOR.
WALTER V. SLOMINSKI
BY
Olsen and Stephenson
ATTORNEYS

United States Patent Office 3,288,503
Patented Nov. 29, 1966

3,288,503
SPRING CLIP
Walter V. Slominski, Lexington, Ky., assignor to Hoover Ball and Bearing Company, Saline, Mich., a corporation of Michigan
Filed May 4, 1964, Ser. No. 364,630
1 Claim. (Cl. 287—189.35)

This invention relates generally to seating structures which employ zigzag springs and more particularly to an improved clip for attaching springs of this type to supporting frame rails.

Furniture seating structures, such as davenports and chairs, are commonly made with wooden frames on which zigzag wire springs are mounted. As used herein, the term "zigzag wire" is inclusive of both "sinuous wire," which consists of spaced torsion bar portions connected at their ends by curved connecting wire portions, and "formed wire" which consists of spaced torsion bar portions connected by straight connecting wire portions, both of which are illustrated in United States Patent No. 3,095,189, assigned to the assignee of this invention. The zigzag wire springs are mounted so that they extend between a pair of generally parallel rails in the wooden frame in numbers sufficient to form a spring surface on which the padding and upholstery are supported. Clips have been employed in the past to facilitate the attachment of the springs to the rails. However, difficulties have often been encountered with clips pulling out of the wooden rails and with the springs interfering with other frame structure because of the manner in which the springs had to be assembled with the clips used in the past. Also it has been necessary, in the case of clips heretofore commonly used, to pre-load the torsion bar portions in the springs which are hooked to the clips in order to provide these torsion bar portions with sufficient stiffness and load resisting characteristics. It is an object of this invention, therefore, to provide an improved clip which can be assembled with springs without requiring pre-loading of the spring torsion bar portions which hook to the clips, will not pull out of a supporting rail, and which positions the attached end of the spring so that it will not interfere with other portions of the frame.

A further object of this invention is to provide an improved spring clip of the above-described type which can readily be assembled with a wooden rail which might be of poor quality wood, and which is so constructed that it is readily adapted to either one of two standard width rails.

Further objects, features and advantages of this invention will become apparent from a consideration of the following description, the appended claims, and the accompanying drawing in which:

Figure 1:
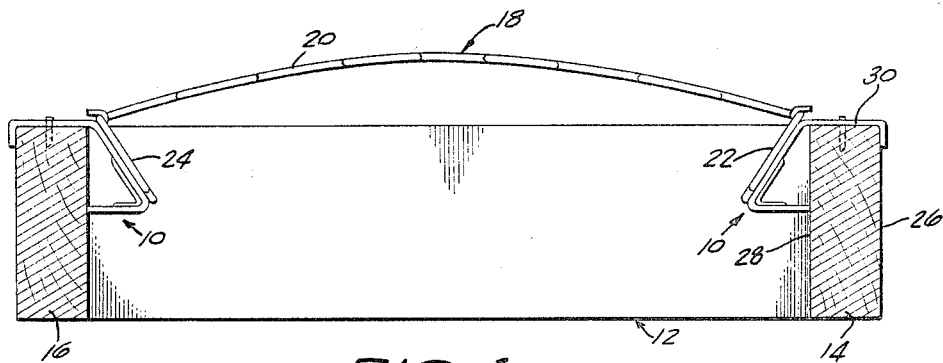
FIGURE 1 is a sectional view of a seat structure employing spring clips of this invention.

With reference to the drawing, a pair of spring clips of this invention, indicated generally at 10, are illustrated in FIG. 1 in assembly relation with a seating structure frame 12 which includes two substantially parallel spaced rails 14 and 16, and a plurality of zigzag wire springs, one of which is shown at 18. The spring 18 has a main deck or body portion 20 which serves as a support for the usual padding and upholstery (not shown), and a pair of end portions 22 and 24 which are attached to the clips 10. Since the assembly of the clips 10 with the frame rails 14 and 16 and the spring end portions 22 and 24 are identical, only the assembly of the clip 10 with the rail 14 and the spring end portion 22 will be described in detail hereinafter.

The rail 14 has an outer side 26, an inner side 28, and a surface 30 which extends therebetween and which is hereinafter sometimes referred to as the "top side" of the rail 14 merely for convenience of description, since it is to be understood that the assembly of the clip 10 with a supporting frame rail is accomplished in substantially the same manner whether the rail 14 is positioned as shown so that the surface 30 constitutes the top side or is positioned in a back frame in which case the surface 30 is not the top side of the rail 14. Consequently, the term "top side" is not to be considered limiting.

Figure 2:
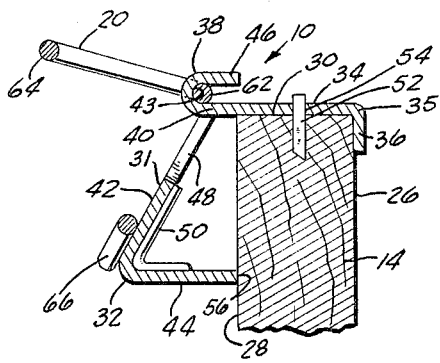
FIGURE 2 is a fragmentary sectional view illustrating one form of the spring clip of this invention mounted on a frame rail in a supporting relation with one end of a zigzag wire spring, and looking substantially along the line 2—2 in FIG. 3.
Figure 3:
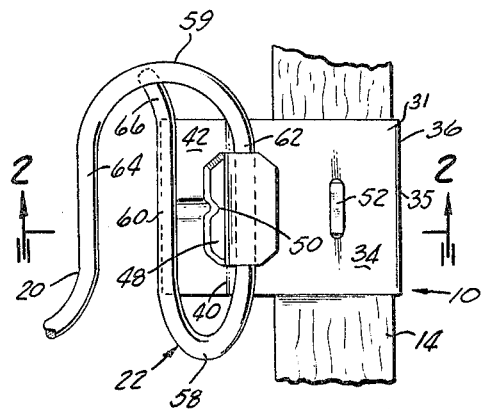
FIGURE 3 is a plan view of the structure illustrated in FIG. 2.

As best appears in FIGS. 2 and 3, the clip 10 consists of a one piece body 32, illustrated as being formed of metal, but which can be formed of plastic, having an outer surface 31 and shaped to form a main or top plate portion 34 formed at one end 35 with a depending leg 36 which is at substantially right angles to the plate portion 34. A portion 38 of the body 32 located at the opposite end 40 of the plate portion 34 is return bent upon itself so as to form a hook which is substantially parallel to the plate portion 34. An inclined brace portion 42 of the body 32 extends downwardly and inwardly from the end 40 of the plate portion 34 and terminates in a leg 44 which extends in a direction back in under the top plate portion 34. In the clip 10, the hook 38 is formed by cutting out a portion 46 from the brace portion 42 and bending it upwardly and rearwardly to a position substantially parallel to the top plate portion 34. As a result, an opening 48 is formed in the brace portion 42 and the inner surface 43 of the hook 38 is formed by a portion of the outer surface of body 32. A reinforcing rib 50 is also formed on the brace portion 42 and the leg 44.

In the assembly of the clip 10 with the frame rail 14 and the spring end portion 22, the clip top plate portion 34 is positioned in surface-to-surface engagement with the top side 30 of the rail 14 such that the leg 36 is in similar engagement with the outer side 26 of the frame 14. In this position of the top plate portion 34, the retainer hook 38 is spaced inwardly from the inner side 28 of the rail 14. A staple 52 is then driven through openings 54, only one of which is shown, in the top plate portion 34 so as to retain the clip 10 in this position. With a rail 14 of the width illustrated in FIGS. 2 and 3, which in actual practice is ⅞″, the terminal end 56 of the leg 44 engages the inner side 28 of the rail 14 in this position of the clip 10.

As shown in FIGS. 2 and 3, the spring 18 is formed with torsion bar portions connected by connecting wire portions, two of which are shown at 58 and 59. The endmost torsion bar portion 60 is connected to the next to the endmost torsion bar portion 62 by the connecting wire portion 58 and the next to the endmost torsion bar portion 62 and the second to the endmost torsion bar portion 64 are connected by the connecting wire portion 59. The torsion bar portion 62, which forms the juncture of the spring portions 20 and 22, is positioned in the hook 38 and the torsion bar portion 60 is engaged with the inner side of the brace portion 42 adjacent the lower end thereof. This arrangement locates the torsion bar 64 in a spaced relation with the clip 10. The straight torsion bar portion 60, which constitutes one end of the spring 18, is formed with a curved extension 66 which projects to one side of the brace portion 42. This extension 66 is formed as an incident to the forming of the spring 18 on automatic wire forming equipment. When the clip 10 is utilized to attach the spring 18 to the rail 14, this extension 66 is in a spaced relation with the inner side 28 of the rail 14 as shown in FIGS. 2 and 3 and extends downwardly in the frame 12 a minimum distance so that it does not interfere with any portion of the frame 12. In the past, difficulty has been encountered with interference between the extension 66 and portions of the frame 12 when it was necessary to position the extension 66 so that it engaged the inner side of the frame rail 14.

Because the included angle between the top plate portion 34 and the brace 42 is greater than 90°, by at least 10° in the illustrated embodiment of the invention, the included angle between the main and end portions 20 and 22 of the spring 18 is substantially less than 90°. As a result, the spring 18 can be bent to substantially the shape shown in FIG. 1, subjected to a heat treatment, and then installed on the rails 14 and 16 without requiring any pre-loading of the torsion bar portion 62. When the included angle between the spring portions 20 and 22 is 90° or greater, it is necessary to perform a pre-loading operation on the spring 18, following heat treating, in order to provide the torsion bar 62 with sufficient stiffness and resistance to load characteristics to function desirably in the final seating structure. As a result, when the clips 10 are utilized, such a pre-loading operation of the spring 18 is avoided thereby eliminating one step in the production of the spring 18 with a consequent cost saving.

During use of the spring 18 in a seating structure, it exerts inward and downward forces on the clip 10. The downward forces are transmitted to the rail 14 by the clip top plate portion 34 and the inward forces on the clip 10 are similarly transmitted to the rail 14 through the leg 36. As a result, the spring loads on the clip 10 are taken up by the clip portions 34 and 36 so that the loads on the staple 52 are negligible, the staple 52 merely functioning to prevent the clip 10 from shifting longitudinally of the rail 14. As a result, low quality wood may be utilized for the frame 14 without risking the clip 10 becoming accidentally disassembled from the rail 14 since the staple 52 is not required to carry loads and therefore is not likely to come loose from the rail 14.

Figure 5:
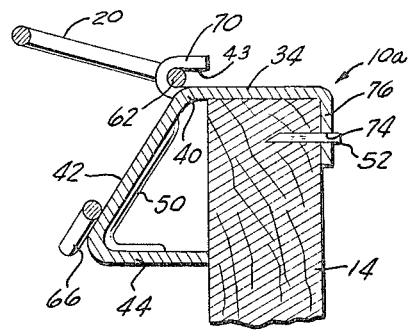
FIGURE 5 is a transverse sectional view of the structure shown in FIG. 4, as seen from substantially the line 5—5 in FIG. 4.
Figure 4:
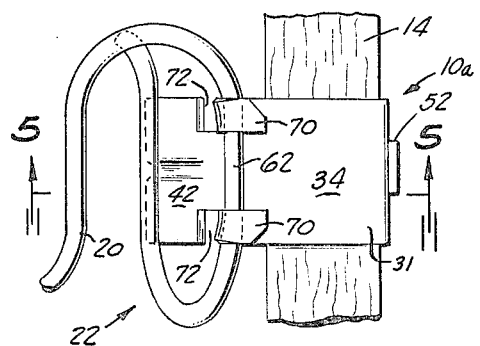
FIGURE 4 is a plan view of another form of the spring clip of this invention shown mounted on a frame rail and arranged in a supporting relation with one end of a zigzag wire spring.

In FIGS 4 and 5, another form of the clip of this invention is illustrated and indicated generally by the numeral 10a. The clip 10a is shown mounted on the frame rail 14 and assembled with the end portion 22 of the spring 18, and since the clip 10a is very similar to the clip 10, like numerals are used on the clip 10a to indicate like parts on the clip 10, and only the differences between the clip 10a and the clip 10 will be described in detail hereinafter. The clip 10a differs from the clip 10 primarily in the substitution in the clip 10a of a pair of aligned hooks 70 for the hook 38 in the clip 10. Hooks 70 perform the same function in the clip 10a as the hook 38 in the clip 10, namely, retention of the spring torsion bar portion 62, and are formed by cutting out and bending back a pair of strips, which prior to cutting and bending, are located in the brace portion 42. As a result, the brace portion 42 in the clip 10a has a pair of side notches or openings 72 in place of the central opening 48 in the clip 10.

Also in the clip 10a, the openings 54 in the top plate portion 34 are eliminated and replaced by staple openings 74, only one of which is shown, which are formed in a leg 76 which depends from the top plate portion 34 and is slightly longer than the leg 36 in the clip 10 so as to accommodate a staple 52 which is driven into the frame rail 14 through the openings 74. It is to be understood that the clip 10 may be formed with a longer rear leg 76 so that it can be attached by means of a horizontal staple 52, in place of the vertical staple 52, and likewise, the clip 10a can be provided with openings 54 so that it can be attached by a vertical staple 52 if desired. The clip 10a functions in all respects the same as the clip 10 and has all of the advantages previously described and attributed.

Figure 7:
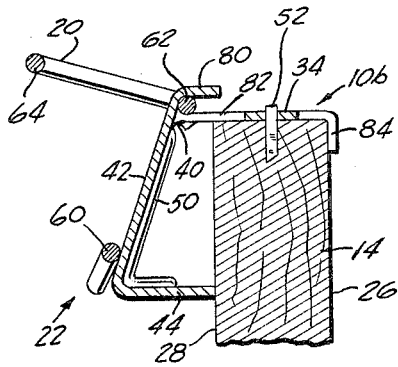
FIGURE 7 is a sectional view of the structure shown in FIG. 6, looking substantially along the line 7—7 in FIG. 6.
Figure 6:
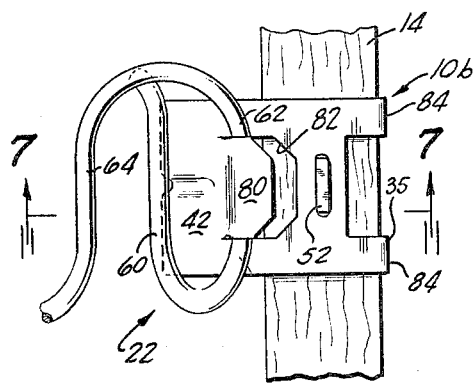
FIGURE 6 is a plan view of still another modified form of the spring clip of this invention, illustrated similarly to FIGS. 3 and 4.

In FIGS 6 and 7 another form of the clip of this invention is illustrated mounted on the frame rail 14 in a supporting relation with the spring end portion 22, and indicated generally by the numeral 10b. The clip 10b is likewise very similar to the clip 10 previously described, so that like numerals are used on the clip 10b to indicate like parts on the clip 10, and only the differences between the clip 10b and the clips 10 and 10a will be described in detail hereinafter. A retention hook 80 for the spring torsion bar portion 62 is formed in the clip 10b by cutting and bending a strip from the top plate portion 34 so as to form an opening 82 in the top plate portion 34. The retainer hook 80 functions exactly like the hooks 38 and 70 previously described in connection with the clips 10 and 10a.

Also, the clip 10b is formed with a pair of spaced legs 84 in place of the legs 36 and 76 utilized in the clips 10 and 10a, respectively, for the purpose of reducing the amount of raw material necessary to fabricate the clip 10b. The legs 84 function like the legs 36 and 76, to transmit horizontal loads on the clip 10b to the frame rail 14, so as to eliminate the necessity for loading the staple 52. It is to be understood that the spaced legs 84 can be utilized in the clips 10 and 10a in place of the legs shown therein and that, similarly, either of the legs 36 and 76 could be utilized in the clip 10b in place of the spaced legs 84.

Figure 8:
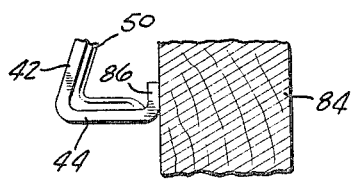
FIGURE 8 is a fragmentary sectional view illustrating the lower portion of a clip and its relation to the frame rail on which it is mounted, and it is to be understood that the clip illustrated in FIG. 8 can be any one of the clips shown in FIGS. 2, 5 and 7.

As shown in FIGS. 2, 5 and 7, the inner end 40 of the top plate portion 34 of each of the clips 10, 10a and 10b is spaced inwardly from the inner side 28 of the frame rail 14. As a result, all the clips 10, 10a and 10b are readily adapted for mounting on a frame rail 14 which is thicker than the frame rail 14 shown in FIGS. 1–7. Such an adaptation is illustrated in FIG. 8 in which a thicker frame rail 84 is shown. In such case, the terminal end portion 86 of the clip leg 44 is bent at right angles to the leg 44 so as to effectively shorten the length of the leg 44. Frame rails are commonly made in two standard thicknesses, namely, ⅞″ and 1⅛″. Consequently, when a clip 10, 10a or 10b is assembled with a ⅞″ rail 14, it is assembled as shown in FIGS. 2, 5 or 7, and when it is assembled with a 1⅛″ rail 84, the leg 44 is bent as shown in FIG. 8 so as to readily adapt the clip for the thicker frame rail 84.

Figure 9:
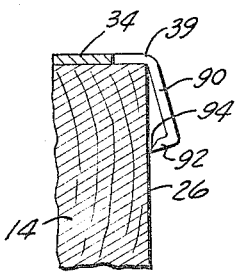
FIGURE 9 is a fragmentary sectional view of a portion of any of the previously illustrated forms of the clip of this invention, modified for slightly different assembly with a frame rail, and showing the clip in position for attachment to a frame rail, and looking substantially along the line 9—9 in FIG. 11.
Figure 10:
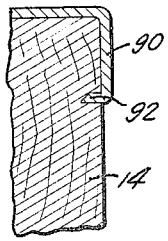
FIGURE 10 is a sectional view of the structure illustrated in FIG. 9 showing the clip in its finely assembled position with the frame rail.
Figure 11:
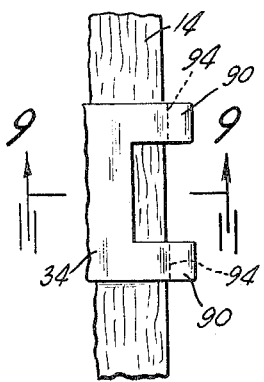
FIGURE 11 is a plan view of the structure shown in FIG. 9.

FIGS. 9, 10 and 11 illustrate a modification of any one of the clips 10, 10a or 10b to adapt the clip for mounting on the frame rail 14 without the use of the retaining staple 52 or nails. In such case, the rear end 35 of the clip plate portion 34 is formed with one or more downwardly inclined legs 90, illustrated as being two in number, arranged so that the included angle between the leg 90 and the top plate portion 34 is greater than 90°, and illustrated as being about 105°. The lower end of each leg 90 is formed with an extension 92 of relatively short length which extends at substantially 90° to the leg 90 and which terminates in a sharpened point such as the illustrated chisel point 94.

In the assembly of a clip 10, 10a or 10b provided with one or more legs 90 with the spring end portion 22 and the rail 14, the spring end portion 22 is first assembled with the clip, as shown in FIGS. 2, 5 and 7. The top plate portion 34 of the clip is then positioned against the top surface 30 of the frame rail 14 so that the end 35 of the top plate portion 34 is substantially aligned with the outer side 26 of the rail 14, and in which position, the chisel point leg extension 92 is spaced slightly from the frame rail outer side 26. A hammer or the like is then employed to drive the chisel point leg extension 92 into the frame rail 14 through the outer side 26 as shown in FIG. 10. This results in bending the leg 90 relative to the top plate portion 34 so that the included angle therebetween is reduced to substantially 90° as also illustrated in FIG. 10. The clip portions 34 and 90 then resist the downward and inward forces, respectively, applied to the clip during use.

Figure 12:
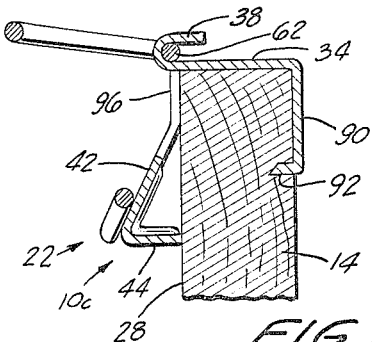
FIGURE 12 is a sectional view, illustrated similarly to FIG. 2 showing yet another modified form of the spring clip of this invention.

If it is desired to mount a clip having a mounting leg 90 on a rail 14 or 16 prior to attachment of the spring 18 to the clip, the clip can be formed as illustrated in FIG. 12. The clip 10c shown in FIG. 12 has one or more mounting legs 90 secured to the rail 14 in the manner described above in connection with the clip of FIGS. 9–11 and has its inclined brace portion 42 formed with an upper clamping portion 96 which is substantially parallel to a leg 90. The portion 96 engages the inner surface 28 of rail 14 so that when the leg extension 92 is driven into the rail 14, the frictional engagement of section 96 with rail 14 retains the clip 10c on the rail 14. As a result, clip 10c is retained on rail 14 in a fixed position prior to assembly of spring 18 with clip 10c.

The clip 10c has a hook 38 formed like the hook 38 on clip 10, but if desired the hook 38 can be formed like the hooks 70 and 80 shown in FIGS. 5 and 7.

From the above description it is seen that this invention provides improved clips 10–10c, inclusive, which are readily attached to a supporting rail so as to effectively resist the forces applied to the clip by the spring 18 during use of the supporting seat structure. By virtue of the forming of each of the clips so that the included angle between the top plate portion 34 and the brace portion 42 is greater than 90°, the economical manufacture of a spring 18 which is assembled with each of the clips is facilitated, and the clip can readily be adapted to supporting rails of varying widths.

It will be understood that the spring clip which is herein disclosed and described is presented for purposes of explanation and illustration and is not intended to indicate limits of the invention, the scope of which is defined by the following claim.

What is claimed is:

A clip for attaching a wire spring to a frame rail, said clip comprising a body formed from a substantially rectangular plate having an outer surface and shaped to form a top portion provided with a pair of ends, said body having a brace portion formed integral at one of its ends with one end of said plate top portion and arranged relative thereto such that at least a part of said brace portion is inclined with respect to said plate top portion so that the included angle therebetween is between 90° and 180°, said body brace portion having a portion thereof cut out and bent out of the plane of said brace portion so as to form upwardly extending integral hook means on said body located at said one end of said top plate portion, said hook means having an inner surface formed by the outer surface of said plate, and a brace leg integral with the opposite end of said brace portion and extended therefrom in a substantially parallel spaced relation with said top plate portion.

References Cited by the Examiner
UNITED STATES PATENTS

| | | | |
|---|---|---|---|
| 1,452,599 | 4/1923 | Hames | 189—35 |
| 2,538,855 | 1/1951 | Asaro | 267—110 |
| 2,652,885 | 9/1953 | Engel | 267—103 |
| 2,685,330 | 8/1954 | Handren et al. | 5—259 X |
| 2,705,527 | 4/1955 | Flint et al. | 267—107 |
| 3,098,244 | 7/1963 | Rothbauer | 5—260 X |

ARTHUR L. LA POINT, *Primary Examiner.*